US008699979B2

United States Patent
Rofougaran

(10) Patent No.: US 8,699,979 B2
(45) Date of Patent: *Apr. 15, 2014

(54) CALIBRATION OF A RECEIVER FOR CHANNEL EQUALIZATION USING A TRANSMITTER

(75) Inventor: Ahmadreza Rofougaran, Marina Del Rey, CA (US)

(73) Assignee: Broadcom Corporation, Irvine, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,680

(22) Filed: Apr. 6, 2012

(65) Prior Publication Data

US 2012/0196547 A1   Aug. 2, 2012

Related U.S. Application Data

(63) Continuation of application No. 12/494,074, filed on Jun. 29, 2009, now Pat. No. 8,160,525, which is a continuation of application No. 11/536,651, filed on Sep. 29, 2006, now Pat. No. 7,570,965.

(51) Int. Cl.
*H04B 1/18* (2006.01)
(52) U.S. Cl.
USPC ........................... 455/180.3; 455/260
(58) Field of Classification Search
USPC .......... 455/180.3, 259, 260, 502, 63.1, 67.13; 375/327, 355, 362
See application file for complete search history.

(56) References Cited

U.S. PATENT DOCUMENTS

| 5,065,451 A * | 11/1991 | Leveque .......................... 455/72 |
| 6,788,199 B2 * | 9/2004 | Crabtree et al. .......... 340/539.13 |
| 7,570,965 B2 * | 8/2009 | Rofougaran ................... 455/502 |
| 8,160,525 B2 * | 4/2012 | Rofougaran ............... 455/180.3 |
| 2004/0133912 A1 * | 7/2004 | Thomas et al. .................. 725/80 |

* cited by examiner

*Primary Examiner* — Sonny Trinh
(74) *Attorney, Agent, or Firm* — Farjami & Farjami LLP

(57) ABSTRACT

Aspects of a method and system for compensating for using a transmitter to calibrate a receiver for channel equalization are provided. Various embodiments of the invention may be applicable wireless devices in TDM systems, Bluetooth, and/or WLAN applications, for example. Transmit tones may be generated by a transmitter PLL and the baseband response may be measured for each of the injected tones. The tones may be swept over a frequency range and a corresponding oscillator signal may be mixed with the received signal to determine the response of, for example, the receiver filters. Adjusting any of a plurality of receiver and/or transmitter parameters based on baseband measurements may provide appropriate channel compensation or calibration. Accordingly, the baseband circuitry may generate equalization signals, which may be utilized to adjust receiver and/or transmitter circuitry. This approach may be provide I/Q balancing and transmit filtering calibration after receiver calibration is completed.

14 Claims, 6 Drawing Sheets

CALIBRATION OF A RECEIVER FOR CHANNEL EQUALIZATION USING A TRANSMITTER

This is a continuation of application Ser. No. 12/494,074 filed Jun. 29, 2009.

CROSS-REFERENCE TO RELATED APPLICATIONS/INCORPORATION BY REFERENCE

This application is a continuation of U.S. patent application Ser. No. 11/536,651, filed on Sep. 29, 2006.

The above stated application is hereby incorporated herein by reference in its entirety.

FIELD OF THE INVENTION

Certain embodiments of the invention relate to handling of wireless signals. More specifically, certain embodiments of the invention relate to a method and system for compensating for using a transmitter to calibrate a receiver for channel equalization.

BACKGROUND OF THE INVENTION

The use of Wireless Personal Area Networks (WPANs) has been gaining popularity in a great number of applications because of the flexibility and convenience in connectivity they provide. WPAN systems, such as those based on Class 2 Bluetooth (BT) technology, generally replace cumbersome cabling and/or wiring used to connect peripheral devices and/or mobile terminals by providing short distance wireless links that allow connectivity within a 10-meter range. Though, for a limited number of applications, higher-powered Class 1 BT devices may operate within a 100-meter range. In contrast to WPAN systems, Wireless Local Area Networks (WLANs) provide connectivity to devices that are located within a slightly larger geographical area, such as the area covered by a building or a campus, for example. WLAN systems are based on IEEE 802.11 standard specifications, typically operate within a 100-meter range, and are generally utilized to supplement the communication capacity provided by traditional wired Local Area Networks (LANs) installed in the same geographic area as the WLAN system.

In some instances, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Both Bluetooth and WLAN radio devices, such as those used in, for example, handheld wireless terminals, generally operate in the 2.4 GHz (2.4000-2.4835 GHz) Industrial, Scientific, and Medical (ISM) unlicensed band. Other radio devices, such as those used in cordless phones, may also operate in the ISM unlicensed band. While the ISM band provides a suitable low-cost solution for many of short-range wireless applications, it may also have some drawbacks when multiple users operate simultaneously. For example, because of the limited bandwidth, spectrum sharing may be necessary to accommodate multiple users. Multiple active users may also result in significant interference between operating devices. Moreover, in some instances, microwave ovens or other noisy devices may also operate in this frequency spectrum and may produce significant interference or blocking signals that may affect Bluetooth and/or WLAN transmissions.

When operating a wireless device or terminal that supports Bluetooth and/or WLAN wireless protocols or standards, for example, receiver equalization may be necessary to compensate for different effects such as group delay and/or signal blockers that result from interference between many operating devices, for example. In this regard, the wireless device or terminal may need to provide with built-in mechanisms that enable the equalization, that is, compensation, of the receiver channel when a user operates the wireless device. In this regard, the necessary equalization or compensation mechanisms may need to consider instances when the wireless protocol receive frequency band and transmit frequency band are similar and also instances when they may be different, for example.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for compensating for using a transmitter to calibrate a receiver for channel equalization, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for compensating for using a transmitter to calibrate a receiver for channel equalization. Various aspects of the invention may be applicable to time division multiplexed (TDM) systems, Bluetooth, ZigBee, and/or WLAN, for example. In this regard, various tones may be generated by a transmitter (Tx) phase locked-loop (PLL) in a wireless device and the response of baseband circuitry within the wireless device may be measured for each of the injected tones. The tones may be swept over a particular frequency range in order to provide adequate tuning and the response of receiver filters to the injected tones may be measured at by the baseband circuitry. When the transmitter generates a tone, f1, for example, then a corresponding oscillator signal or tone, f1+delta, may be mixed with the received signal at the receiver (Rx). In some instances, the delta or offset from the generated tone may be utilized to determine the response of, for example, the filters in the transmitter.

Since the expected response of the receiver circuitry may be known in advance, this expected response may be compared with the actual response and compensation for any variation may be done. The compensation may be done by adjusting any of a plurality of receiver and/or transmitter parameters based on the baseband results. The adjustments may comprise, for example, varying the amount of current that may be supplied to the power amplifier in the transmitter. Accordingly, the baseband circuitry may generate one or more equalization signals, which may be utilized to adjust the transmitters circuitry. This approach may be utilized to provide in-phase (I) and quadrature (Q) balancing at the transmitter. For example, after the receiver is calibrated using the transmitter PLL, the receiver may be used to calibrate I/Q and filtering of the transmit channel by coupling the transmitter to the receiver and modulating the receiver output.

Figure 1:
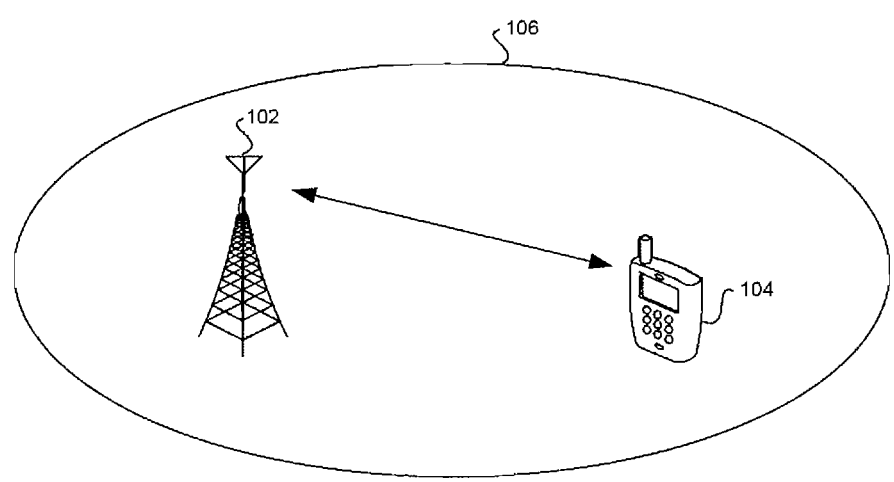
FIG. 1 is a diagram illustrating an exemplary wireless communication system, in connection with an embodiment of the invention.

FIG. 1 is a diagram illustrating an exemplary wireless communication system, in connection with an embodiment of the invention. Referring to FIG. 1, there is shown an antenna 102 and a wireless device 104. The antenna 102 may comprise suitable logic, circuitry, and/or code that may enable wireless communication of voice and/or data with the wireless device 104. The antenna 102 may communicate with the wireless device 104 over at least one of a plurality of wireless communication technologies that may comprise cellular communication technologies, for example. The antenna 102 may provide a coverage area 106 over which the wireless device 104 may communicate with the antenna 102. The antenna 102 may be communicatively coupled to at least one of a plurality of communication networks, such as cellular networks, for example, which may enable communication between the wireless device 104 and other devices communicatively coupled to the corresponding communication network.

The wireless device 104 may comprise suitable logic, circuitry, and/or code that may enable wireless communication of voice and/or data with the antenna 102. The wireless device 104 may enable communication over a plurality of wireless communication technologies or wireless protocols that may comprise cellular technologies. For example, the wireless device 104 may support wireless communication technologies that are based on time division multiplexing (TDM), for example. Moreover, the wireless device 104 may support wireless communication technologies such as wireless local area networks (WLAN), ZigBee and/or Bluetooth, for example.

The wireless device 104 may also enable compensation or calibration of the RF front-end operations while in operation. For example, the wireless device 104 may enable utilizing a transmitter in the RF front-end to calibrate or equalize at least a portion of the receive channel. Similarly, wireless device 104 may enable calibrating at least a portion of the transmitter when the receiver or receive channel has been calibrated. In this regard, calibration may occur in instances when the receive frequency band and the transmit frequency band of the wireless communication protocol are the same or substantially the same. Moreover, calibration may also occur in instances when the receive frequency band and the transmit frequency band of the wireless communication protocol are different or substantially different.

Figure 2:
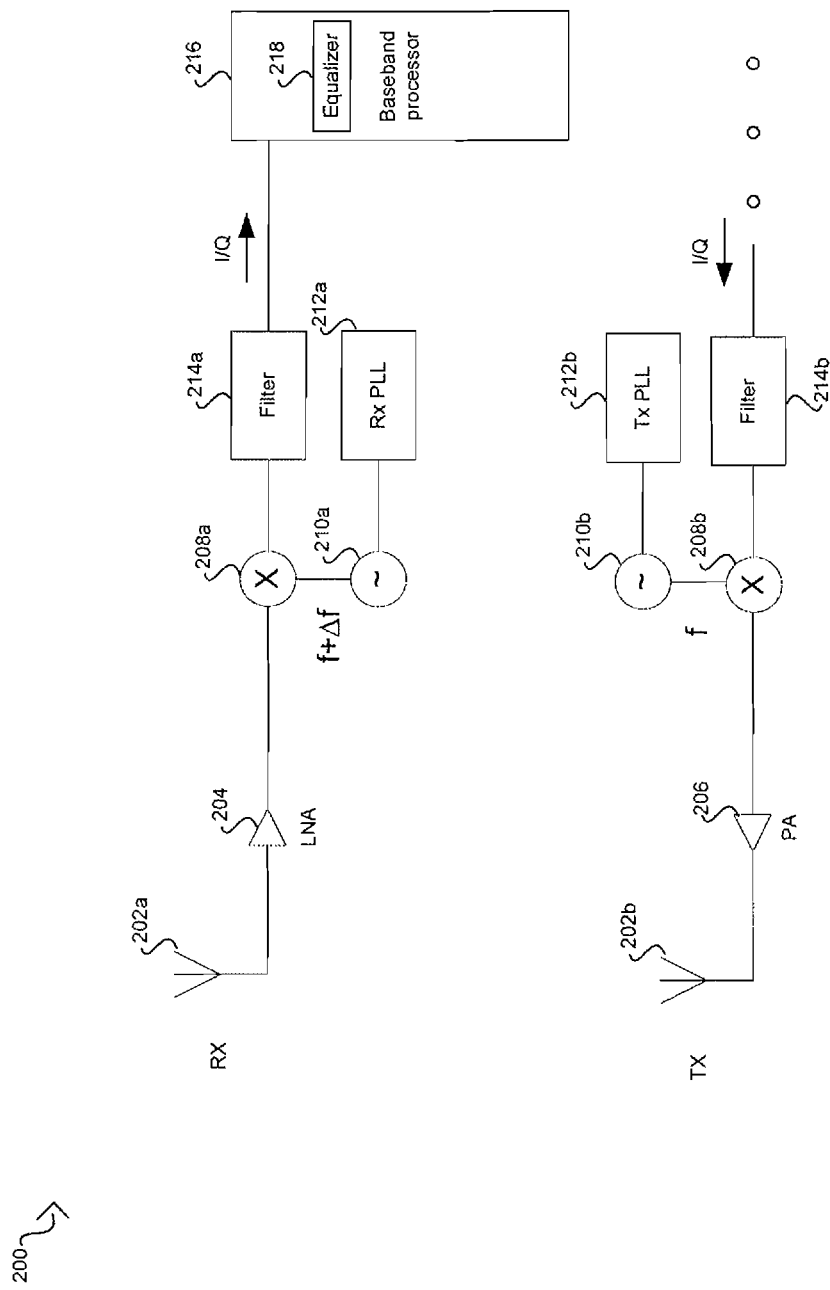
FIG. 2 is a block diagram illustrating an exemplary transceiver system that enables receiver calibration via the transmitter PLL when transmission and reception occur in similar frequency bands, in accordance with an embodiment of the invention.

FIG. 2 is a block diagram illustrating an exemplary transceiver system that enables receiver calibration via the transmitter PLL when transmission and reception occur in similar frequency bands, in accordance with an embodiment of the invention. Referring to FIG. 2, there is shown a portion of a wireless device 200 that may comprise a transmitter (Tx) or transmitter portion and a receiver (Rx) or receiver portion. The receiver may comprise an antenna 202a, a low noise amplifier (LNA) 204, a mixer 208a, a filter 214a, an oscillator 210a, and a Rx phase locked-loop (PLL) 212a. The transmitter may comprise an antenna 202b, a power amplifier (PA) 206, a mixer 208b, a filter 214b, an oscillator 210b, and a receiver Tx PLL 212b. The portion of a wireless device 200 may also comprise a baseband processor 216. The baseband processor 216 may comprise an equalizer 218. The portion of a wireless device 200 may enable calibration in wireless protocols or wireless technologies where transmission and reception occur in similar frequency bands, such as in WLAN and Bluetooth, for example.

The antenna 202a may comprise suitable logic, circuitry, and/or code that may enable receiving wireless signals, such as those transmitted from antenna 102 disclosed in FIG. 1, for example. The LNA 204 may comprise suitable logic, circuitry, and/or code that may enable amplification of signals received via the antenna 202a. The Rx PLL 212a may comprise suitable logic, circuitry, and/or code that may enable generation of a signal with predetermined frequency characteristics that may be utilized by the oscillator 210a. In this regard, the wireless device may generate at least one signal that may be utilized to control operation of the Rx PLL 212a. The Rx PLL 212a may enable generating a tone or single frequency that may be utilized to calibrate at least a portion of the receiver. The tone or frequency may be an offset, $\Delta f$, from the tone or frequency generated by the Tx PLL 212b. Moreover, the Rx PLL 212a may enable generating a plurality of tone offsets over a frequency band that may be utilized to calibrate or tune at least a portion of the receiver.

The oscillator 210a may comprise suitable logic, circuitry, and/or code that may enable generation of a receive oscillator tone or receive oscillator frequency based on the signal communicated by the Rx PLL 212a. The mixer 208a may comprise suitable logic, circuitry, and/or code that may enable mixing signals received via, for example, the antenna 202a with the receive oscillator frequency generated by the oscillator 210a. In this regard, the receiver may utilize the mixing operations provided by the mixer 208a for downconverting carrier frequencies, such as intermediate frequencies (IF), for example, to baseband frequencies. The filter 214a may comprise suitable logic, circuitry, and/or code that may enable filtering of baseband signals, such as in-phase (I) and quadrature (Q) signals, for example. The filter 214a may be a polyphase filter, for example.

The baseband processor 216 may comprise suitable logic, circuitry, and/or code that may enable processing of baseband signals, such as I and Q signals, for example. The baseband processor 216 may enable processing of measurements performed during calibration operations to determine appropriate compensation, such as adjustment of receiver parameters, to equalize the receive channel. In this regard, the equalizer 218 may comprise suitable logic, circuitry, and/or code that may enable receiver channel equalization based on the results generated by the baseband processor 216 during calibration measurements. The equalizer 218 may utilize matrix parameters and/or look-up tables to adjust the receiver parameters in order to achieve channel equalization.

The antenna 202b may comprise suitable logic, circuitry, and/or code that may enable transmitting wireless signal to other devices such as the antenna 102 disclosed in FIG. 1, for example. The PA 206 may comprise suitable logic, circuitry, and/or code that may enable amplification of signals for transmission via the antenna 202b. The Tx PLL 212b may comprise suitable logic, circuitry, and/or code that may enable generation of a signal with predetermined frequency characteristics that may be utilized by the oscillator 210b. In this regard, the wireless device may generate at least one signal that may be utilized to control the operation of the Tx PLL 212b. The Tx PLL 212b may enable generating a tone or single frequency that may be utilized to calibrate at least a portion of the receiver. Moreover, the Tx PLL 212b may enable generating a plurality of tones over a frequency band that may be utilized to calibrate or tune at least a portion of the receiver.

The oscillator 210b may comprise suitable logic, circuitry, and/or code that may enable generation of a transmit oscillator tone or transmit oscillator frequency based on the signal communicated by the Tx PLL 212b. The mixer 208b may comprise suitable logic, circuitry, and/or code that may enable mixing signals received via, for example, the filter 214b with the transmit oscillator frequency generated by the oscillator 210b. In this regard, the transmitter may utilize the mixing operations provided by the mixer 208a for upconverting carrier frequencies, such as intermediate frequencies (IF) or baseband frequencies, for example, to RF frequencies. The filter 214a may comprise suitable logic, circuitry, and/or code that may enable filtering of baseband signals, such as in-phase (I) and quadrature (Q) signals, for example. The filter 214a may be a polyphase filter, for example.

Figure 3:
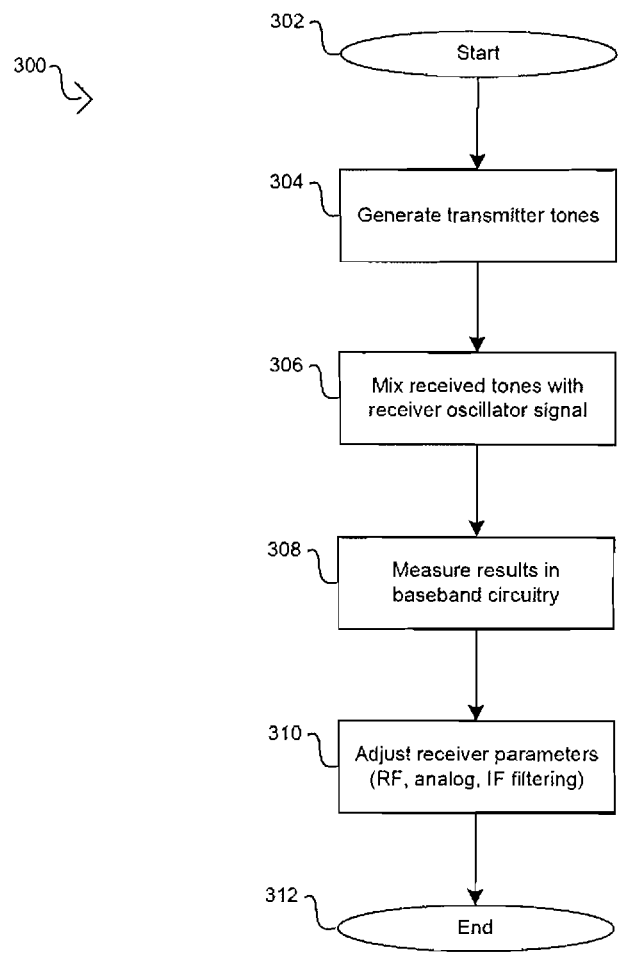
FIG. 3 is a flow diagram illustrating exemplary steps for calibrating the receiver portion of the system disclosed in FIG. 2, in accordance with an embodiment of the invention.

FIG. 3 is a flow diagram illustrating exemplary steps for calibrating the receiver portion of the system disclosed in FIG. 2, in accordance with an embodiment of the invention. Referring to FIG. 3, there is shown a flow diagram 300. In step 304, after start step 302, a calibration of the receiver portion of a wireless device, such as the wireless device 104 disclosed in FIG. 1, may comprise generating transmitter tones via the Tx PLL 212b. The Tx PLL 212b may generate at least one tone or frequency in a frequency band that may be communicated to the receiver in the wireless device. In this regard, the transmitter tone may be injected into the receiver portion of the wireless device by transmission from the antenna 202b to the antenna 202a, for example. The transmitter tone may also be injected into the receiver by a connection that may be enabled between the transmitter and the receiver, for example. When the Tx PLL 212b is utilized to sweep through a frequency band, more than one transmitter tone or frequency, such as f1, f2, . . . , fN, may be generated.

In step 306, the received transmitter tone or tones may be mixed in the mixer 208a with the receiver oscillator signal generated by the oscillator 210a. In this regard, the receiver oscillator signal may be an offset of the transmitted tone, where the offset may be defined by an offset variable, $\Delta f$. The Rx PLL 212a may be utilized to sweep through a plurality of offset values in a frequency range in order to provide additional flexibility in the calibration operation. For example, when the Tx PLL 212b sweeps through a plurality of tones in a frequency band, the calibration operation may be utilized to adjust receive parameters in the RF operations or components in the receiver. When the Rx PLL 212a sweeps through a plurality of offset values in a frequency band, the calibration operation may be utilized to adjust receive parameters in analog operations and/or IF filtering operations, such as those performed by the filter 214a, for example.

In step 308, the baseband processor 216 may make measurements based on the signals generated by sweeping through the transmission tones and/or the offset values, and may determine adjustments or parameter compensation necessary to provide channel equalization in the receiver. The measurements may indicate differences that may occur between I and Q signals, for example, and may be utilized to adjust or compensate the channel in order to equalize the signals. Accordingly, the equalizer 218 within the baseband processor 216 may be utilized to enable a matrix and/or a look-up table to adjust receive parameters. In this regard, when the wireless device is in operation, the presence of an effect such as group delays and/or signal blockers, may result in receive channel compensation via the equalizer 218 for those frequencies for which calibration has been performed.

In step 310, the equalizer 218 may adjust receive parameters in the RF operations or components in the receiver when a transmitter tone sweep is performed. The equalizer 218 may also be utilized to adjust receive parameters in analog and/or IF filtering operations in the receiver when an offset value sweep is performed. After step 310, the process may proceed to end step 312.

Figure 4:
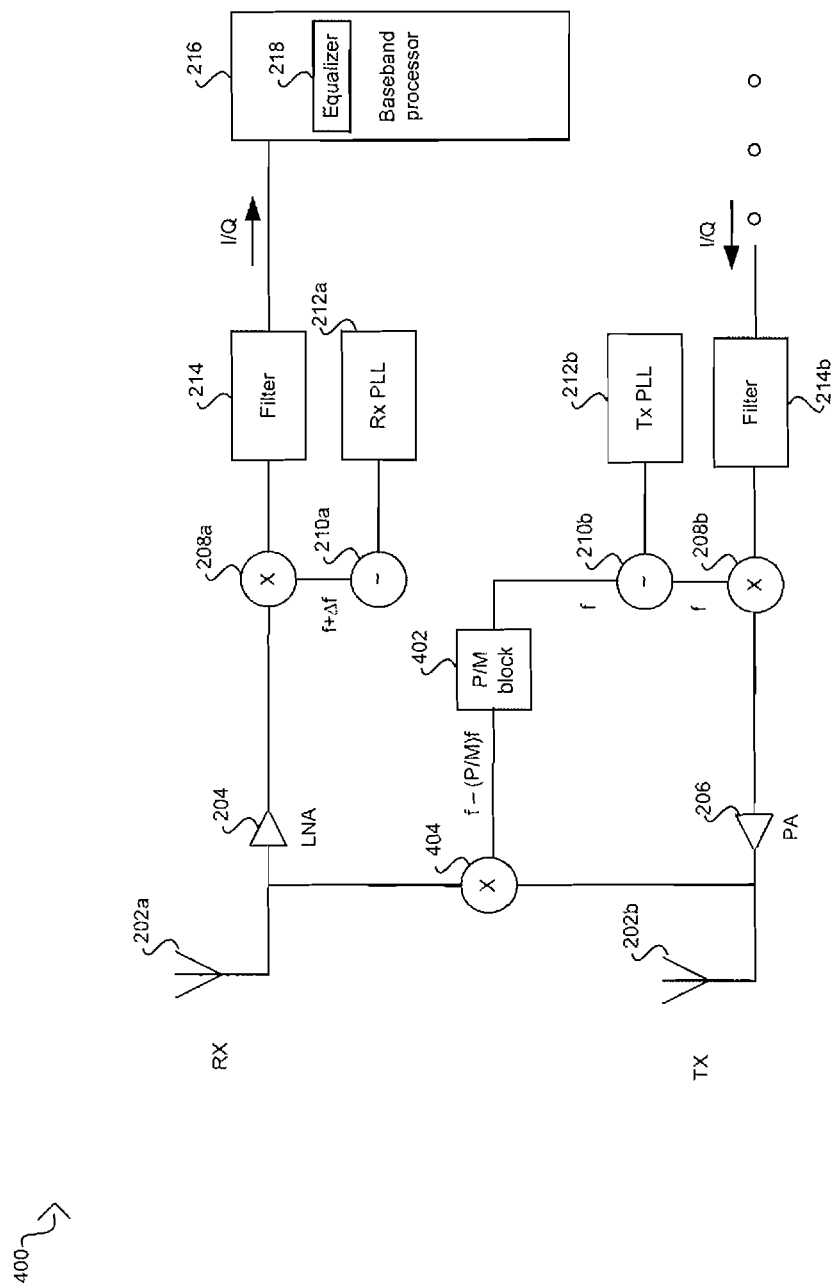
FIG. 4 is a block diagram illustrating an exemplary transceiver system that enables receiver calibration via the transmitter PLL when transmission and reception occur in different frequency bands, in accordance with an embodiment of the invention.

FIG. 4 is a block diagram illustrating an exemplary transceiver system that enables receiver calibration via the transmitter PLL when transmission and reception occur in different frequency bands, in accordance with an embodiment of the invention. Referring to FIG. 4, there is shown a portion of a wireless device 400 that may comprise a transmitter (Tx) or transmitter portion, a receiver (Rx) or receiver portion, and a baseband processor 216. The transmitter and receiver portions and the baseband processor 216 may be the same or substantially similar to those disclosed in FIG. 2. The portion of a wireless device 400 may also comprise a P/M block 402 and a mixer 404 that may be utilized to enable calibration of the receiver in wireless protocols or wireless technologies where transmission and reception occur in different frequency bands, such as some cellular technologies, for example.

The P/M block 402 may comprise suitable logic, circuitry, and/or code that may enable scaling of the oscillator frequency generated by the oscillator 210b. In this regard, the P/M block may generate an oscillator frequency f−(P/M)f, where f is the oscillator frequency generated by the oscillator 210b. The mixer 404 may comprise suitable logic, circuitry, and/or code that may enable mixing the oscillator frequency generated by the P/M block 402. The output of the mixer 404 may be injected into the receiver for calibration operations when the receiver frequency band is different from the transmission frequency band.

Figure 5:
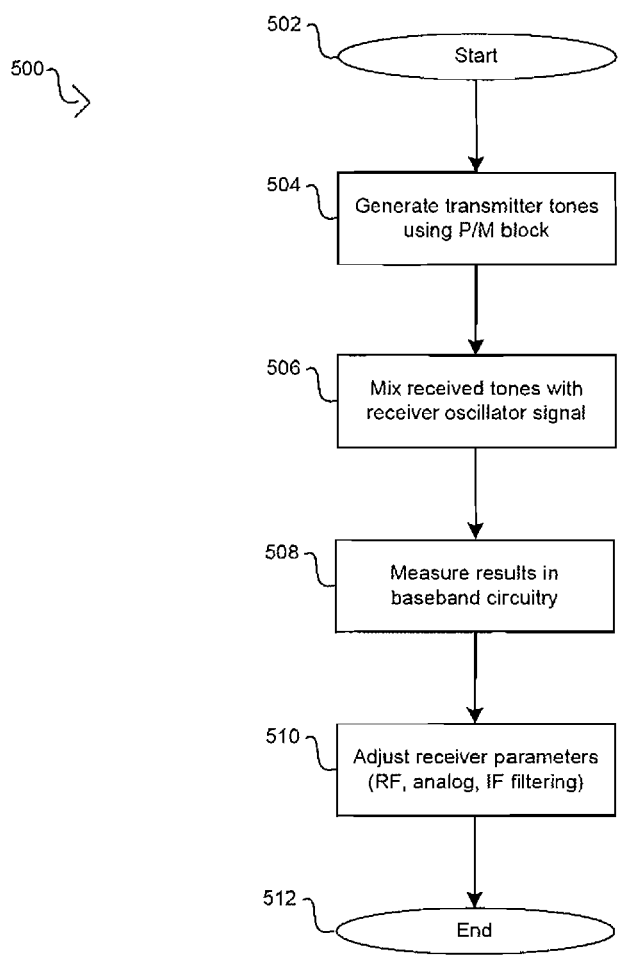
FIG. 5 is a flow diagram illustrating exemplary steps for calibrating the receiver portion of the system disclosed in FIG. 4, in accordance with an embodiment of the invention.

FIG. 5 is a flow diagram illustrating exemplary steps for calibrating the receiver portion of the system disclosed in FIG. 4, in accordance with an embodiment of the invention. Referring to FIG. 5, there is shown a flow diagram 500. In step 504, after start step 502, a calibration of the receiver portion of a wireless device, such as the wireless device 104 disclosed in FIG. 1, may comprise generating transmitter tones via the Tx PLL 212b. The Tx PLL 212b may generate at least one tone or frequency that may be adjusted or modified by the P/M block 402 and/or the mixer before being communicated to the receiver in the wireless device. Modifications to the tones or frequencies generated from the Tx PLL 212b may enable calibration in instances when transmission and reception occur in different frequency bands for a wireless communication technology or wireless protocol. In this regard, the adjusted transmitter tone may be injected into the receiver portion of the wireless by a connection that may be enabled between the transmitter and the receiver, for example. When the Tx PLL 212b is utilized to sweep through a frequency band, more than one transmitter tone or frequency, such as f1, f2, . . . , fN, may be generated.

In step 506, the received transmitter tone or tones may be mixed in the mixer 208a with the receiver oscillator signal generated by the oscillator 210a. In this regard, the receiver oscillator signal may be an offset of the transmitted tone, where the offset may be defined by an offset variable, Δf. The Rx PLL 212a may be utilized to sweep through a plurality of offset values in a frequency range in order to provide additional flexibility in the calibration operation. For example, when the Tx PLL 212b sweeps through a plurality of tones in a frequency band, the calibration operation may be utilized to adjust receive parameters in the RF operations or components in the receiver. When the Rx PLL 212a sweeps through a plurality of offset values in a frequency band, the calibration operation may be utilized to adjust receive parameters in analog operations and/or IF filtering operations, such as those performed by the filter 214a, for example.

In step 508, the baseband processor 216 may make measurements based on the signals generated by sweeping through the transmission tones and/or the offset values, and may determine adjustments or parameter compensation necessary to provide channel equalization in the receiver. The measurements may indicate differences that may occur between I and Q signals, for example, and may be utilized to adjust or compensate the channel in order to equalize the signals. In this regard, the equalizer 218 within the baseband processor 216 may be utilized to enable a matrix and/or a look-up table to adjust receive parameters. In this regard, when the wireless device is in operation, the presence of an effect such as group delays and/or signal blockers, may result in receive channel compensation via the equalizer 218 for those frequencies for which calibration has been performed.

In step 510, the equalizer 218 may adjust receive parameters in the RF operations or components in the receiver when a transmitter tone sweep is performed. The equalizer 218 may also be utilized to adjust receive parameters in analog and/or IF filtering operations in the receiver when an offset value sweep is performed. After step 510, the process may proceed to end step 512.

Figure 6:
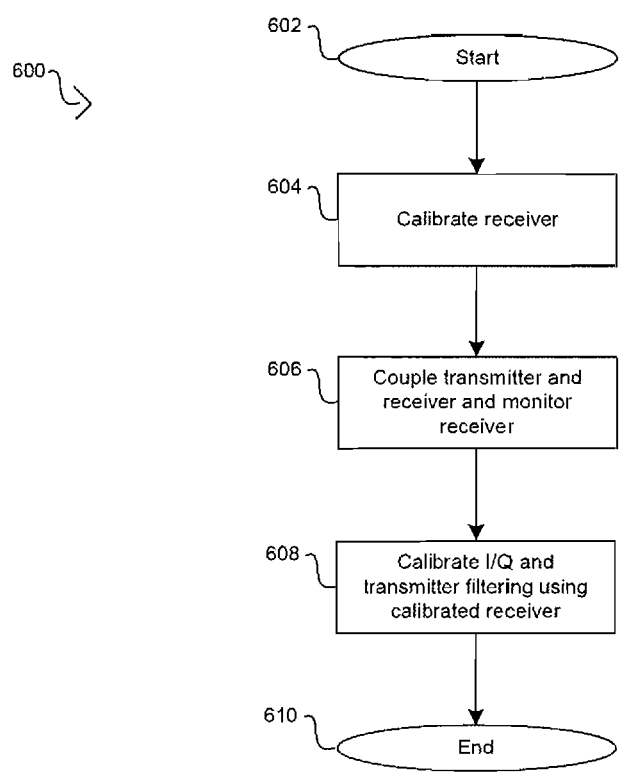
FIG. 6 is a flow diagram illustrating exemplary steps for calibrating the transmitter portion of the systems disclosed in FIG. 2 and FIG. 4, in accordance with an embodiment of the invention.

FIG. 6 is a flow diagram illustrating exemplary steps for calibrating the transmitter portion of the systems disclosed in FIG. 2 and FIG. 4, in accordance with an embodiment of the invention. Referring to FIG. 6, there is shown a flow diagram 600. In step 604, after start step 602, the receiver in a wireless device may be calibrated based on the approaches disclosed in FIGS. 2-4, for example. In step 606, once the receiver has been calibrated for selected frequencies or tones, the receiver may be utilized to monitor the transmitter. Monitoring may be achieved by transmitting I and Q signals and then coupling the output of the transmitter with the input of the receiver to verify or check that the I and Q signals received by the receiver are matched or equalized. In step 608, the measurements performed by the baseband processor 216 on the receiver I and Q signals may be utilized by the equalizer 218 to calibrate or match the I and Q signals in the transmitter and the filtering in the transmitter.

In an embodiment of the invention, a method for handling wireless signals may comprise receiving at least one transmission tone generated from a PLL coupled to a transmitter portion of a wireless device. The received transmission tone in a receiver portion of the wireless device may be mixed by utilizing a receive oscillator tone that is offset from the transmission tone. Moreover, filtering may be calibrated in the receiver portion of the wireless device based on results from baseband processing of the mixing of the generated transmission tone and receive oscillator tone.

The transmitter portion of the wireless device may sweep over a frequency range when generating said at least one transmission tone. A radio frequency (RF) portion of the receiver portion of the wireless device may be calibrated based on results generated when the transmitter portion of said wireless device sweeps over a frequency range when generating the at least one transmission tone. Sweeping over an offset range may be performed when mixing the generated transmission tone and the receive oscillator tone. An analog portion of the receiver portion of the wireless device may be calibrated based on results from the sweeping over the offset range. The generated transmission tone may be adjusted by a ratio when a wireless protocol receive frequency band is different from the wireless protocol transmit frequency band. An in-phase (I) and a quadrature (Q) transmit signals in the transmitter portion of the wireless device may be calibrated after the calibrating of the receiver portion of the wireless device. Moreover, calibrating filtering in the transmitter portion of the wireless device after the calibrating filtering in the receiver portion of the wireless device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A transceiver comprising:
   at least one circuit configured to generate a transmission tone and a receive oscillator tone;
   said at least one circuit further configured to mix said transmission tone with said receive oscillator tone;

said at least one circuit further configured to calibrate said transceiver.

2. The transceiver of claim 1, wherein said at least one circuit is further configured to sweep over a frequency range when generating said transmission tone.

3. The transceiver of claim 1, wherein said at least one circuit is further configured to calibrate a radio frequency (RF) portion of said transceiver.

4. The transceiver of claim 1, wherein said at least one circuit is further configured to calibrate in-phase (I) and quadrature (Q) transmit signals.

5. The transceiver of claim 1, wherein said at least one circuit is further configured to calibrate a transmit filter in said transceiver.

6. A transceiver comprising:
- at least one circuit configured to generate a transmission tone and a receive oscillator tone;
- said at least one circuit further configured to mix said transmission tone with said receive oscillator tone to generate an output for calibrating a receiver in said transceiver.

7. The transceiver of claim 6, wherein said at least one circuit is further configured to sweep over a frequency range when generating said transmission tone.

8. The transceiver of claim 6, wherein said at least one circuit is further configured to calibrate a radio frequency (RF) portion of said transceiver.

9. The transceiver of claim 6, wherein said at least one circuit is further configured to calibrate in-phase (I) and quadrature (Q) transmit signals.

10. The transceiver of claim 6, wherein said at least one circuit is further configured to calibrate a transmit filter in said transceiver.

11. A wireless communication system comprising:
- a transceiver configured to generate a transmission tone and a receive oscillator tone;
- said transceiver further configured to mix said transmission tone with said receive oscillator tone to generate an output for calibrating a receiver in said wireless communication system.

12. The wireless communication system of claim 11, wherein said transceiver is further configured to sweep over a frequency range when generating said transmission tone.

13. The wireless communication system of claim 11, wherein said transceiver is further configured to calibrate a radio frequency (RF) portion of said transceiver.

14. The wireless communication system of claim 11, wherein said transceiver is further configured to calibrate in-phase (I) and quadrature (Q) transmit signals.

* * * * *

UNITED STATES PATENT AND TRADEMARK OFFICE
CERTIFICATE OF CORRECTION

PATENT NO.         : 8,699,979 B2                                                    Page 1 of 1
APPLICATION NO.    : 13/441680
DATED              : April 15, 2014
INVENTOR(S)        : Ahmadreza Rofougaran It is certified that error appears in the above-identified patent and that said Letters Patent is hereby corrected as shown below:

Title page, item (73): Change "CO" to --CA--

Signed and Sealed this
Twenty-seventh Day of January, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,699,979 B2 | Page 1 of 1 |
| APPLICATION NO. | : 13/441680 | |
| DATED | : April 15, 2014 | |
| INVENTOR(S) | : Ahmadreza Rofougaran | |

It is certified that error appears in the above-identified patent and that said Letters Patent is hereby corrected as shown below:

Title page, item (73): Change "Irvine, CO" to --Irvine, CA--

This certificate supersedes the Certificate of Correction issued January 27, 2015.

Signed and Sealed this
Twelfth Day of May, 2015

Michelle K. Lee
*Director of the United States Patent and Trademark Office*